2,833,827
Patented May 6, 1958

2,833,827

TRI (3,5-DI LOWER ALKYL-4-HYDROXY PHENYL)-SULFONIUM CHLORIDES AND METHOD OF PREPARING SAME

Willi Hahn, Koln-Stammheim, and Rudolf Stroh, Leverkusen-Bayerwerk, Germany, assignors to Farbenfabriken Bayer Aktiengesellschaft, Leverkusen, Germany, a corporation of Germany No Drawing. Application January 13, 1956
Serial No. 558,849

Claims priority, application Germany January 17, 1955

6 Claims. (Cl. 260—607)

This invention relates to a process for the production of aromatic sulphonium compounds.

Attempts have already been made to produce sulphonium compounds from phenol and thionyl chloride in the presence of aluminium chloride (Smiles and Le Rossignol, Journal of the Chemical Society (London), 89, 705 (1906)). It was, however, not possible to isolate the sulphonium chloride as such, since the main products were resins. When this reaction was carried out in a solvent, 4,4'-dihydroxydiphenyl sulphoxide was obtained (Smiles and Bain, Journal of the Chemical Society (London), 91, 1119 (1907)).

It has now been found that it is surprisingly possible to obtain good yields of sulphonium compounds by a process which comprises reacting a 2,6-disubstituted phenol preferably in an organic solvent, with thionyl chloride in the presence of a Friedel-Crafts catalyst.

Suitable Friedel-Crafts catalysts are for example aluminium chloride and bromide and iron-III-chloride.

Examples of 2,6-disubstituted phenols which can be used in the process of the invention are 2,6-diethyl phenol, 2-methyl-6-ethyl phenol, 2,6-diisopropyl phenol, 2,6-dibutyl phenol, 2-ethyl-6-butyl phenol, 2,6-dimethyl phenol, 2-chloro-6-ethyl phenol and 2,6-dichlorophenol. It is also possible to use phenols which contain further substituents in the m-position as well as the two substituents in the o-position, such as for example 2,6-diethyl-3-methyl phenol.

In order to avoid the formation of resins and to permit better control of the reaction, the reaction is preferably carried out in a solvent. For this purpose it is only possible to use solvents which do not react with thionyl chloride or the Friedel-Crafts catalysts, such as for example carbon disulphide, nitrobenzene or chlorinated hydrocarbons such as carbon tetrachloride or di-chlorobenzene.

The process of the invention is preferably carried out at a relatively low temperature in the range from 0–20° C. although it is possible in certain cases to use higher or even lower temperatures. In order to complete the reaction, it is generally recommended that a final reaction for some time at a somewhat higher temperature follow the reaction proper.

The novel process can for example be carried out by adding the Friedel-Crafts catalyst in portions to the phenol dissolved in a solvent and then running in thionyl chloride slowly while cooling; a temperature in the region of 10° C. is advantageous. In order to complete the reaction, stirring of the mixture is continued until no more hydrogen chloride is evolved, it being possible for the temperature to rise to about 30° C.

The reaction products can be worked up by adding ice and hydrochloric acid to decompose an excess of the Friedel-Crafts catalyst and thionyl chloride and then driving off the solvent by means of steam. The hydrochlorides of the sulphonium compounds are generally sparingly soluble and can then be obtained by filtration.

For example, tri-(3,5-diethyl-4-hydroxy-phenyl)-sulphonium chloride is obtained in a good yield from 2,6-diethyl phenol.

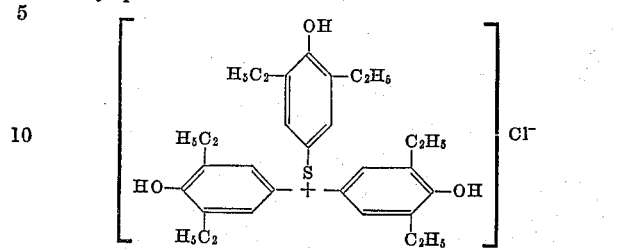

The chloride ion is replaceable in the usual manner by other acid radicals.

The compounds obtainable by the process of the invention are valuable intermediate products for the production of dyestuffs, textile auxiliaries, pest control agents, pharmaceutical products, rubber auxiliaries and additives to fuels and mineral oils. Furthermore, they can be incorporated into bentonites. Thus, compounds are obtained with similar properties as bentonites containing quarternary ammonium compounds which can be used as additives to paints. With acid dyes they form insoluble salts which can be used as pigment dyes.

The following examples further illustrate the invention without, in any way, limiting it thereto.

Example 1

150 grams (1 mol) of 2,6-diethyl phenol are dissolved in 400 cc. of carbon disulphide and 89 grams (⅔ mol) of finely powdered anhydrous aluminium chloride are introduced in portions with external cooling.

79.5 grams (⅔ mol) of thionyl chloride are run into this mixture while stirring, and the temperature of the reaction mixture is maintained at +16° C. by external cooling and controlling the speed at which the thionyl chloride is introduced, this taking about 30 minutes. Stirring of the mixture is thereafter continued at the same temperature until no more hydrogen chloride is evolved, this taking about 1 hour. The mixture, which is now dark in color, is mixed with about 1 kilogram of ice and 50 cc. of concentrated hydrochloric acid. After the black aluminium chloride-addition compound has decomposed, the solvent is driven off by means of steam and the reaction product is filtered off from the cooled residue. Yield of crude product: 170 grams.

By recrystallisation from methanol/ether, 135 grams of pure tri-(2,5-diethyl-4-hydroxy-phenol)-sulphonium chloride are obtained with a decomposition point of 253–254° C.

Example 2

180 grams (1 mol) of 2,6-diisopropyl phenol are reacted with 89 grams of aluminium chloride and 79.5 grams of thionyl chloride in 400 cc. of carbon disulphide by the method described in Example 1. After the thionyl chloride has been added, stirring of the mixture is continued at +20° C. until no more hydrogen chloride is evolved. During this time the initially red color of the mixture changes to black. 195 grams of crude product are obtained by using the working up method described in Example 1. By recrystallisation from methanol/ether, 140 grams of pure tri(3,5-diisopropyl-4-hydroxy-phenyl) sulphonium chloride are obtained, with a decomposition point of 258–260° C.

Example 3

208 grams (1 mol) of 2,6-dibutyl phenol, 89 grams of aluminium chloride and 79.5 grams of thionyl chloride yield 210 grams of crude tri-(3,5-dibutyl-4-hydroxy-phenyl)-sulphonium chloride when reacted and worked up as described in Example 1. The pure compound decomposes at 230–231° C.

Example 4

190 grams of crude product are obtained by reacting 180 grams (1 mol) of 2-ethyl-6-butyl phenol with 89 grams of aluminium chloride and 79.5 grams of thionyl chloride, and then working up the product, using the method described in Example 1. The pure tri-(3-ethyl-4-hydroxy-5-butyl-phenyl)-sulphonium chloride obtained decomposes at 218–219° C.

Example 5

68 grams (½ mol) of 2-methyl-6-ethyl phenol are reacted with 40 grams of thionyl chloride in the presence of 44.5 grams of aluminium chloride as described in Example 1. Stirring is continued at 20° C. until no more hydrogen chloride is evolved and the mixture is worked up in the usual way, 75 grams of crude tri-(3-methyl-4-hydroxy-5-ethyl-phenyl)-sulphonium chloride being obtained. The pure compound melts with slight decomposition at 211° C.

Example 6

78.4 grams (½ mol) of 2-chloro-6-ethyl phenol are reacted with 40 grams of thionyl chloride and 44.5 grams of aluminium chloride as described in Example 1. Stirring of the mixture is continued at 15° C. until no more hydrogen chloride is evolved. 88 grams of crude tri-(3-chloro-4-hydroxy-5-ethyl-phenyl)-sulphonium chloride are obtained by working up in the usual way. The pure compound can be obtained from the crude product by recrystallisation from methanol/ether. Decomposition point 243–245° C.

Example 7

96 grams (½ mol) of 2,6-diisopropyl-3-methyl-phenol are reacted as described in Example 1 with 40 grams of thionyl chloride and 44.5 grams of aluminium chloride. After decomposition with ice and hydrochloric acid, the crude product forms a viscous oil which soon solidifies when expressed on to clay. By extraction with methanol, pure tri-(2-methyl-3,5-diisopropyl-4-hydroxy-phenyl)-sulphonium chloride is obtained, with a decomposition point of 264–265° C.

The reactions described in Examples 1–7 can also be carried out in o-dichlorobenzene or carbon tetrachloride as solvents. The mixtures are then worked up in the same way as described in Example 1 when carbon disulphide was used. The yields of sulphonium salt are the same as those obtained when carbon disulphide was used.

The aluminium chloride used in the foregoing Examples 1 to 7 can be substituted by the equimolecular amount of aluminium bromide or sublimated iron-III-chloride. While the same yield is obtained by using aluminium bromide instead of aluminium chloride a slightly smaller yield is obtained by applying the iron chloride.

Example 8

One mol of tri-(3,5-diethyl-4-oxy-phenyl)-sulphonium chloride obtained according to the procedure of Example 1 are dissolved in a 10% sodium hydroxide solution. Thereafter an aqueous solution of one mol of eosin is added and the mixture acidified with acetic acid, whereby a red pigment dye precipitates which is filtered off. The filtrate does not contain any dyestuff.

Example 9

51.5 grams of tri-(3,5-diethyl-4-oxy-phenyl)-sulphonium chloride are dissolved in 600 cc. of methanol. Thereafter the solution is heated for one hour with powdered bentonite under reflux while stirring. The solid phase is sucked off and washed with methanol to remove adhering sulphonium salt. About 10 to 20 grams of the sulphonium salt are incorporated into the bentonite. The reaction product exhibits a swelling capacity in organic solvents.

We claim:

1. A member selected from the group consisting of tri - (3,5 - lower dialkyl - 4 - hydroxy - phenyl) - sulphonium chlorides.

2. Tri - (3,5 - diethyl - 4 - hydroxy - phenyl) - sulphonium chloride.

3. Tri - (3,5 - diisopropyl - 4 - hydroxy - phenyl)-sulphonium chloride.

4. Tri - (3 - methyl - 4 - hydroxy - 5 - ethyl) - sulphonium chloride.

5. A process for the production of sulphonium compounds, which comprises reacting a substituted phenol substituted in at least each of the 2 and 6 positions with a member selected from the group consisting of lower alkyl radicals and chlorine atoms with thionyl chloride in the presence of Friedel-Crafts catalysts and in the additional presence of an inert solvent.

6. A process for the production of tri-3,5-diethyl-4-hydroxy-phenyl)-sulphonium chloride which comprises reacting 2,6-diethyl-phenol dissolved in an inert diluent with thionyl chloride in the presence of anhydrous aluminium chloride and recovering the reaction product obtained.

References Cited in the file of this patent

UNITED STATES PATENTS 2,713,038   De Jong _____ July 12, 1955

OTHER REFERENCES

Courtot et al.: Compt. Rend. 200, pp. 1541–1543 (1935).

U. S. DEPARTMENT OF COMMERCE

PATENT OFFICE

CERTIFICATE OF CORRECTION

Patent No. 2,833,827      Willi Hahn et al.      May 6, 1958

It is hereby certified that error appears in the printed specification of the above numbered patent requiring correction and that the said Letters Patent should read as corrected below.

Column 2, line 37, for "maintained at $+16°$ C." read --maintained at $+10°$ C.--.

Signed and sealed this 24th day of June 1958.

(SEAL)
Attest:

KARL H. AXLINE

Attesting Officer

ROBERT C. WATSON
Commissioner of Patents